United States Patent Office 2,723,202
Patented Nov. 8, 1955

2,723,202

DEHYDRATION OF FOOD PRODUCTS

Eugene J. Rivoche, Washington, D. C.

No Drawing. Original application March 9, 1951, Serial No. 214,837. Divided and this application October 27, 1954, Serial No. 465,139

10 Claims. (Cl. 99—204)

This invention relates to a method of preserving raw or cooked food products by dehydration, and particularly to a method of preparing readily-reconstitutable, dehydrated food products in which the food products are given a preliminary conditioning treatment which facilitates removal of the moisture therefrom during a subsequent dehydration operation in which apparatus and methods generally used in the food drying industry may be availed of.

The method of the invention is useful in the dehydration of various kinds of food products, such as vegetables, for example, peas, carrots, cabbage, string beans, lima beans, potatoes, beets, asparagus, etc.; fruits, for example, peaches, apricots, plums, apples, etc.; berries, for example, strawberries, blackberries, gooseberries, etc; meats and fish.

In accordance with the invention the food product to be dehydrated is first cooked while mixed, preferably in alternate layers, with the same kind of food product which previously has been cooked and dehydrated. The previously cooked and dried product will maintain the respective layers of fresh, uncooked food product separated and will prevent the particles of the product being cooked from sticking to one another. Also, the interposition of the alternate layers of the previously dried product provides adequate channels for the passage of steam through the mass during the cooking process, and for the passage of drying air during the subsequent dehydration operation. Also, when a layer of the previously dehydrated food product forms the bottom of the mass, it will prevent adherence of the mass to drying apparatus, such as a belt, or the like. The water equivalent to the steam which condenses in the layers of previously dried product during the cooking operation is so small that it will have no appreciable moistening effect on the dried product, such as would interfere with its function of providing passages through the mass of material for the steam; or for air during the subsequent dehydration operation.

The dehydration of the food products is substantially the same regardless of the particular type of species of food product being treated.

After the food product has been washed, it is subjected to the action of sulfur dioxide, either in solution or in gaseous form, benzoic acid, salicylic acid, or other known agent which will stabilize the food product and prevent enzymic action and act as a buffer to maintain substantially the original pH of the food product during subsequent treatment thereof.

The stabilizing treatment of the food product may be carried out, for example, in a cylinder in which sulfur dioxide, either in gaseous or aqueous solution, is injected. If the sulfur dioxide is used in gaseous form it may be injected along with steam. When sulfur dioxide is used as the stabilizing agent, it preferably will be used in concentrations of about 0.1% or 0.2%.

If the food product is one of substantial size, such as carrots or beets, it preferably is sliced or otherwise reduced to smaller particles in order to facilitate the subsequent dehydration thereof.

The cooking of the food product, when admixed with the previously dehydrated food product of like character, may be obtained by steam, hot air, dielectric heating, or any form of heating, which will not add a substantial amount of water to the cooking vessel, such as would appreciably add water to and soften the previously dehydrated food product. When steam is used as the cooking agent, only a relatively small amount is necessary to carry out the cooking of the uncooked food product, and the water equivalent of the steam which is condensed in the previously dehydrated food product will be insignificant since such amount of water will not be enough to appreciably moisten and soften the previously dried product. When the cooking is obtained by means of hot air, dielectric heating, or the like, the steam resulting from the generation of heat in the uncooked food and the flavor substances which are liberated will be largely absorbed or taken up by the previously dried product, but the amount of steam which is liberated during the cooking operation will not be sufficient to appreciably soften the dried product or appreciably affect its separating function in the mixture.

The amount of previously dehydrated food product which is admixed with the uncooked food product may vary from about 10 to 100 parts or more by weight of the previously dehydrated food product per 100 parts by weight of the uncooked food product. While the use of as little as 10% of the previously dehydrated product tends to maintain the particles of the uncooked food product separated and to provide passages for steam during the cooking operation and also passages for air during the subsequent dehydration operation, I normally admix not less than 20% of the previously dehydrated food product with the uncooked food product, and preferably at least 50% or 60% by weight of the uncooked food product.

The previously dehydrated food product will absorb from the uncooked food product, during the cooking operation, the moisture which appears at the surface of the particles thereof so that the resulting mixture may be better handled and maintained in the form of discrete particles during the subsequent dehydrating operation. Also, the mixing of previously dehydrated food product with the uncooked food product during the cooking operation has the further advantage of preventing loss of juices, etc., from the food undergoing cooking, since such juices, etc., when volatilized from the uncooked food during the cooking operation will be absorbed by the previously dehydrated food product.

The cooked admixture of food product as described above may be subjected to the dehydrating operation either with or without prior freezing thereof. However, it is preferred that the cooked admixture be frozen before it is dehydrated since the freezing transforms the soft cooked particles of the food product into firm hard particles which are resistant to damage during subsequent handling, and causes the particles to maintain their discrete form. The freezing of the cooked mass further permits the mixing back of previously dried like food product in those instances where only a relatively small amount of the previously dehydrated product was admixed with the uncooked food product during the cooking operation, or where the food product was cooked without first being admixed with any of the previously dehydrated food product. The admixed previously dehydrated food product provides a mixture quite suitable for air drying in that the particles of previously dehydrated food product provide the necessary channels or passages through the mass of material to enable the gaseous dehydrating agent to pass therethrough.

The admixture of previously dehydrated food product with the uncooked food product prior to cooking, or, in some instances, where the cooked product has a desired rigidity or firmness, the admixture thereof with the food product after cooking, and before the freezing operation, results in the frozen mass being much more readily broken up into particles suitable for the dehydrating operation, since the previously dried product absorbs only a relatively small amount of water and do not freeze to hard masses which offer great resistance to breakage. Consequently, a frozen mass of the admixed material may be broken into suitable size for the dehydrating operation merely by passing it between a pair of rotating cylinders or rolls.

In those cases when it is desired that the food product, cooked in the manner described above, shall have a reduced moisture content, and be of firmer texture, or where the cooked and dehydrated product is desired in powdered form, it is preferred that instead of admixing particles of the previously dehydrated product of substantial size to the food product to be cooked, the previously cooked and dehydrated product shall be reduced to a powder before admixing with the uncooked product, and the resulting mixture preferably stirred gently during the cooking operation. The powdered product has much greater absorbing power than do particles of larger size, and will absorb much more of the moisture, flavors, etc., from the product being cooked, so that the cooked product will be correspondingly drier and firmer. The use of the previously dehydrated product in powdered form is particularly desirable in the dehydration of cooked starchy materials, such as potatoes, when the cooked dehydrated potatoes are desired in powdered form. Also, the subsequent dehydration of the cooked product will be appreciably facilitated because of the reduced moisture content and the firmness of the product, and the property of powder on the surfaces of the cooked particles maintaining such particles separated from one another and preventing them from forming into agglomerates through which the gaseous dehydrating medium cannot readily pass. The use of the previously dehydrated food product in powdered form is also advantageous, in some instances, when the cooked product is frozen prior to the final dehydration operation, since it performs the same separating function with respect to the particles when they are subsequently thawed and while subjected to the final dehydration operation.

When it is desired that the final dehydrated product shall be in the form of slices, or pieces, which may be in diced form, it is often desirable that the returned previously dehydrated product which is admixed with the food product to be cooked shall be partly in powdered form and partly in the form of larger particles. In such cases, the returned powder readily absorbs moisture from the particles of food product during the cooking operation, while the particles of larger size maintain a spacing of the cooked particles which facilitates the final drying manipulations and the passing of the gaseous dehydrating medium through the mass.

The relative amount of the food product in powdered form to the amount of food particles in larger pieces may vary widely as long as the amount of the product in powdered form is sufficient to reasonably well cover the surfaces of the food product to be cooked, and may be in substantially equal amounts.

The dehydrating of the food product, cooked as described above, may be conducted in the same manner as previously described in connection with the dehydration of the raw food product or the food product which is cooked without first being admixed with previously dehydrated food product of like character.

When the dehydration of the food product of the present invention is carried out with meats and fish, the meat or fish preferably will first be formed into slices of from about one-fourth to one-half inch in thickness, and advantageously after such slices have been cut into small pieces of approximately one inch square.

The present method of dehydrating food products of various kinds is particularly desirable in that the resulting product retains its natural color, taste and flavor and does not undergo chemical change during the dehydrating operation. Also, there is no enzymic action or fermentation or other decomposition of the product, particularly when the food product is first given a stabilizing treatment with sulfur dioxide, benzoic acid, salicylic acid or other known stabilizing agent. Therefore, the dehydrated product may readily be reconstituted by the mere addition of moisture to give a food product comparing favorably in color, taste, flavor and texture with the natural food product.

This application is a division of my application Serial No. 214,837, filed March 9, 1951.

I claim:

1. The method of preparing readily reconstitutable, dehydrated solid food products which comprises mixing particles of food product to be cooked with particles of the same food product which previously have been cooked and dehydrated, subjecting the mixture to a cooking heat in the absence of sufficient moisture to bring about such a rehydration of the previously dehydrated food particles as will substantially soften them for a length of time sufficient to cook the uncooked food product, and thereafter passing a gaseous dehydrating medium through the mixed mass of the food product for a length of time sufficient to reduce the mass to a desired degree of dehydration.

2. The method of preparing readily reconstitutable, dehydrated food products as set forth in claim 1 in which the uncooked food product and previously cooked and dehydrated food product are arranged in alternate layers.

3. The method of preparing readily reconstitutable, dehydrated food products as set forth in claim 1 in which the uncooked food product and previously cooked and dehydrated food product are arranged in alternate layers, and in which the alternate layer arrangement is maintained during the dehydration operation.

4. The method of preparing readily reconstitutable, dehydrated food products as set forth in claim 1 in which the uncooked food product is admixed with from about 10 to 100 parts by weight of the previously cooked and dehydrated food product.

5. The method of preparing readily reconstitutable, dehydrated food products as set forth in claim 1 in which the resultant mass of cooked food product is frozen throughout before it is subjected to the gaseous dehydrating medium.

6. The method of preparing readily reconstitutable, dehydrated food products as set forth in claim 1 in which the food product is subjected to the action of a stabilizing agent to prevent enzymic action therein and to buffer the food product to cause it to maintain substantially its normal pH before completion of the cooking operation.

7. The method of preparing readily reconstitutable, dehydrated food products as set forth in claim 1 in which the resultant mass of cooked food product is frozen before it is subjected to the gaseous dehydrating medium, in which the dehydration is initiated while the food product is still frozen and in which the quantity of the dehydrating medium, the temperature thereof and the speed of movement thereof over the food product is so correlated with the rate of thawing of the food product that moisture resulting from thawing is taken up by the dehydrating medium substantially as fast as it is formed.

8. The method of preparing readily reconstitutable, dehydrated food products as set forth in claim 1 in which the mass of cooked food product before being subjected to the dehydrating medium is frozen, the frozen product is broken in smaller particles of a desired size, and the smaller particles while still rigid from the freezing operation are admixed with more of the previously dehydrated food product of like character.

9. The method of preparing readily reconstitutable, dehydrated food products as set forth in claim 1 in which the previously dehydrated food product which is admixed with the food product to be cooked is in powdered form.

10. The method of preparing readily reconstitutable, dehydrated food products as set forth in claim 1 in which the previously dehydrated food product which is admixed with the food product to be cooked is partly in powdered form and partly in the form of larger particles.

References Cited in the file of this patent

UNITED STATES PATENTS

| | | |
|---|---|---|
| 2,490,951 | Dunkley | Dec. 13, 1949 |
| 2,520,891 | Rivoche | Aug. 29, 1950 |